US012716524B2

(12) United States Patent
Fletcher et al.

(10) Patent No.: US 12,716,524 B2
(45) Date of Patent: Aug. 25, 2026

(54) AERODYNAMIC NOISE REDUCING ELEMENT AND CONTROL VALVE COMPRISING SAME

(71) Applicant: FISHER CONTROLS INTERNATIONAL LLC, Marshalltown, IA (US)

(72) Inventors: Benjamin J. Fletcher, Marshalltown, IA (US); Justin P. Goodwin, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 0 days.

(21) Appl. No.: 18/219,489

(22) Filed: Jul. 7, 2023

(65) Prior Publication Data

US 2025/0012377 A1 Jan. 9, 2025

(51) Int. Cl.
*F16K 47/08* (2006.01)
*F16K 5/06* (2006.01)

(52) U.S. Cl.
CPC ............ *F16K 47/08* (2013.01); *F16K 5/0605* (2013.01)

(58) Field of Classification Search
CPC ............................... F16K 47/08; F16K 5/0605
See application file for complete search history.

(56) References Cited

U.S. PATENT DOCUMENTS 514,338 A * 2/1894 Row ........................ F28F 1/022 165/177
4,540,025 A * 9/1985 Ledeen ................. F16K 47/045 251/127
4,889,163 A * 12/1989 Engelbertsson ...... F16K 47/045 251/127
5,180,139 A * 1/1993 Gethmann ............ F16K 5/0605 251/207
5,680,889 A * 10/1997 Boger ....................... F16K 5/12 251/121
6,029,702 A * 2/2000 Leinen .................. F16K 47/045 251/121
6,675,832 B1 * 1/2004 Tran ...................... F16K 47/045 251/368
7,011,109 B2 * 3/2006 Tran ...................... F16K 5/0605 251/118

(Continued)

*Primary Examiner* — Michael R Reid
*Assistant Examiner* — Christopher D Ballman
(74) *Attorney, Agent, or Firm* — MARSHALL, GERSTEIN & BORUN LLP

(57) ABSTRACT

A control valve includes a valve body defining an inlet and an outlet. A valve closure member is also coupled to the valve body, the valve closure member being displaceable relative to the valve body between a first closed position and a second fully-open position. An aerodynamic noise reducing element is disposed within the valve body, the aerodynamic noise reducing element including a plurality of flow channels. The plurality of flow channels includes a first flow channel and a second flow channel. The first flow channel extends along a first flow axis from an open first end to an open second end. The first flow channel includes a first fluid expansion chamber. The second flow channel extends along a second flow axis from an open first end to an open second end. The second flow channel has a second expansion chamber.

20 Claims, 9 Drawing Sheets

(56) References Cited

U.S. PATENT DOCUMENTS

| | | | | |
|---|---|---|---|---|
| 8,047,228 | B2 * | 11/2011 | Depierri | B01J 8/006<br>137/550 |
| 9,377,127 | B2 * | 6/2016 | Chen | F16K 47/045 |
| 9,528,632 | B2 * | 12/2016 | Glaun | B33Y 80/00 |
| 9,677,687 | B2 * | 6/2017 | Yli-Koski | F16K 47/02 |
| 10,302,224 | B2 * | 5/2019 | Kluz | F16K 47/08 |
| 10,724,643 | B2 * | 7/2020 | Kuhlman | F16K 5/0605 |
| 11,162,613 | B2 * | 11/2021 | Jablonski | F16K 5/0605 |
| 11,209,100 | B2 * | 12/2021 | Bell | F16K 47/08 |
| 11,703,147 | B2 * | 7/2023 | Watson | B33Y 10/00<br>251/127 |
| 2017/0234440 | A1 * | 8/2017 | Detmers | F16K 3/34<br>251/118 |
| 2021/0207740 | A1 * | 7/2021 | Watson | F16K 47/02 |
| 2022/0154849 | A1 * | 5/2022 | Jablonski | F16K 27/0218 |

* cited by examiner

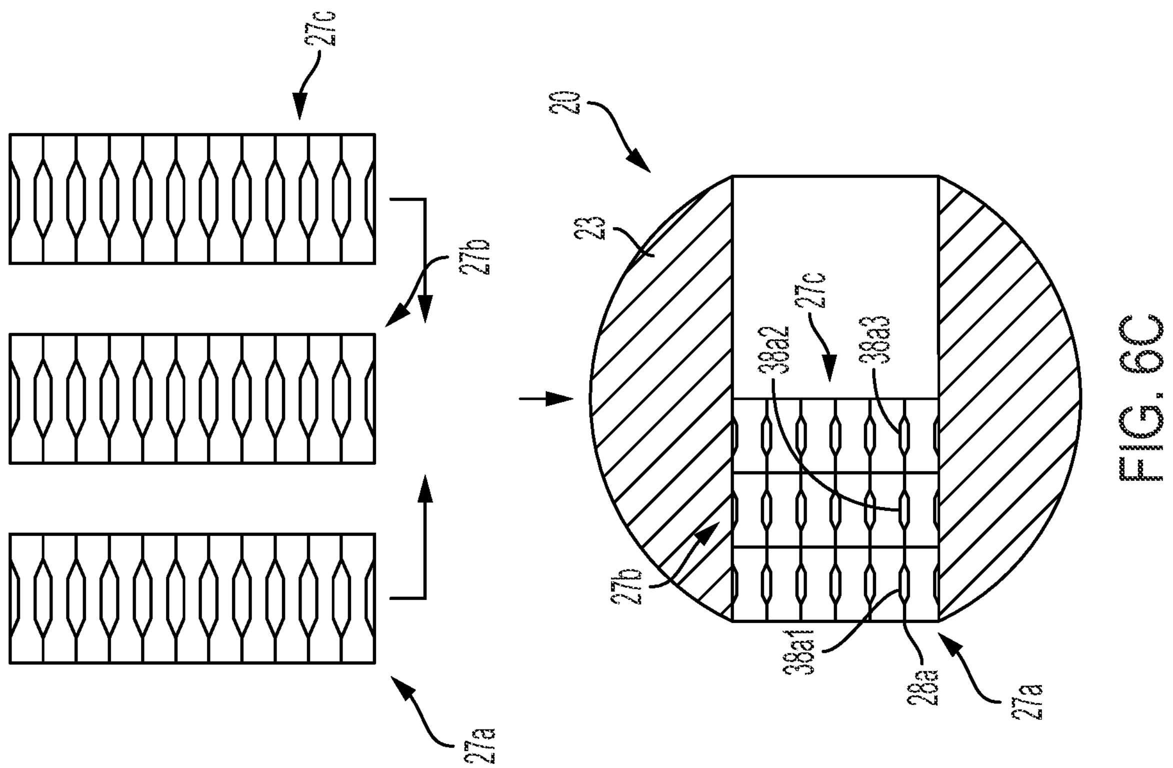
FIG. 6C
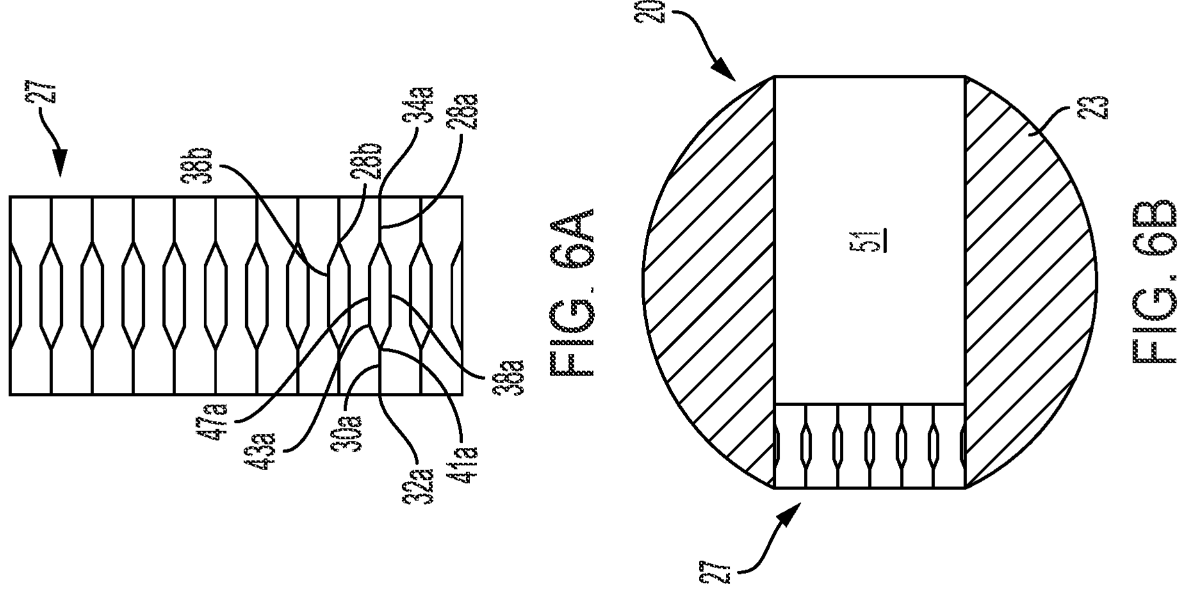
FIG. 6A
FIG. 6B

AERODYNAMIC NOISE REDUCING ELEMENT AND CONTROL VALVE COMPRISING SAME

FIELD OF THE DISCLOSURE

The disclosure relates generally to control valves and, more particularly relates to aerodynamic noise reducing elements for use with control valves that control compressible fluids.

BACKGROUND

Control valves are commonly used in processes to control the flow of a fluid (e.g., a gas, a liquid, etc.) or any other substance through pipes and/or vessels to which they are connected. A control valve typically includes one or more fluid inlets and fluid outlets, and control valves can also include a fluid control element or member (e.g., a ball element, a rotary element, a valve gate, a piston, a valve plug, a control member, etc.) that operates to control fluid flow through passages that fluidly couple the inlet(s) to the outlet(s). The control member is usually configured to engage a sealing structure (e.g., a valve seat) that encompasses a flow path through the valve.

Generally speaking, the control elements (including the fluid control member, the seat, and a cage or other flow passages) are known as "valve trim" or "trim assembly" in the art. In some cases it may be desirable to characterize fluid as it flows through the valve, for example, to reduce pressure and/or to reduce cavitation. In these cases, a trim assembly may be used that includes an element with a plurality of openings, passages, or channels for fluid flow. The openings, passages, or channels may be sized and shaped to characterize fluid flow as the fluid flows through the openings, passages, or channels, for example by decreasing pressure as the fluid moves through the valve trim. This characterization or pressure reducing process generates unwanted noise.

In some valves, such as ball valves, fluid flowing through the valve may be subject to rapid changes in pressure, and this rapid pressure change in the fluid may result in the formation of unwanted aerodynamic noise. More specifically, when the fluid pressure drops, due to increased fluid velocity, turbulence is generated that results in unwanted noise and vibration. In high velocity fluid flows, especially those experiencing high pressure drops, sonic flow can be created that causes shock waves develop, which generate unwanted high frequency noise and vibration.

In valve embodiments aerodynamic noise control devices may be disposed in or adjacent to the inlet such that when the ball valve is in an open position, fluid flows from the inlet to the outlet through the aerodynamic noise control device.

In a typical aerodynamic noise control device assembly (such as the Emerson® V260 or V260A), a dome may be placed in front of an inlet ball valve to stage pressure drops. The dome includes a plurality of machined holes, which limits the size of the holes and therefor the number of holes that can be included. Furthermore, the holes are limited in shape.

In other aerodynamic noise control device assemblies (such as, the Emerson® Vee-Ball™ valve) the flow control device (e.g., the ball element) may include separate flow channels that receive fluid flow when the flow control device is in an open position. These separate flow channels are machined into the ball element, or the ball element is either cast as a single piece and the holes are machined into the separate pieces, or the ball element is fabricated from a plurality of welded pieces that include machined flow channels. In any case, the flow channels are limited in size and shape, similar to the domes discussed above, and the fabrication process is time consuming and expensive.

BRIEF SUMMARY OF THE DISCLOSURE

In accordance with one exemplary aspect, a control valve includes a valve body defining an inlet and an outlet. A valve seat is coupled to the valve body. A valve closure member is also coupled to the valve body, the valve closure member being displaceable relative to the valve body between a first closed position and a second fully-open position. In the first closed position, a sealing portion of the valve closure member sealingly engages a sealing portion of the valve seat to prevent flow of a compressible fluid from the inlet of the valve body to the outlet of the valve body. In the second fully-open position, the sealing portion of the valve closure member is offset from the sealing portion of the valve seat to permit flow of the compressible fluid from the inlet of the valve body to the outlet of the valve body. An aerodynamic noise reducing element is disposed within the valve body, the aerodynamic noise reducing element includes a plurality of flow channels. The plurality of flow channels includes a first flow channel and a second flow channel. The first flow channel extends along a first flow axis from an open first end to an open second end. The first flow channel includes a first fluid expansion chamber. The second flow channel extends along a second flow axis from an open first end to an open second end. The second flow channel has a second expansion chamber.

In accordance with another exemplary aspect, an aerodynamic noise reducing element is adapted for use with a valve assembly. The valve assembly has a valve body defining an inlet and an outlet, a valve seat coupled to the valve body between the inlet and the outlet, and a valve closure member coupled to the valve body. The valve closure member is displaceable relative to the valve body between a first closed position and a second fully-open position. In the first closed position, a sealing portion of the valve closure member sealingly engages a sealing portion of the valve seat. In the second fully-open position, the sealing portion of the valve closure member is offset from the sealing portion of the valve seat. The aerodynamic noise reducing element includes a plurality of flow channels. The plurality of flow channels includes a first flow channel and a second flow channel. The first flow channel extends along a first flow axis from an open first end to an open second end. The first flow channel has an inner surface that defines a first flow area. The inner surface of the first flow channel has a first cross-sectional shape normal to the first flow axis. The first flow channel includes a first expansion chamber. The second flow channel extends along a second flow axis from an open first end to an open second end. The second flow channel has an inner surface that defines a second flow area. The inner surface of the second flow channel has a second cross-sectional shape normal to the second flow axis. The second flow channel includes a second expansion chamber.

In further accordance with any one or more of the foregoing exemplary aspects, a control valve or an aerodynamic noise reducing element may further include, in any combination, any one or more of the following preferred forms.

In one preferred form, the first flow channel includes a plurality of first expansion chambers arranged in series.

In another preferred form, the expansion chambers in the plurality of first expansion chambers are discrete and separated from one another.

In another preferred form, the expansion chambers in the plurality of first expansion chambers are continuous, forming a single expansion chamber with an increasing staged volume.

In another preferred form, the second flow channel includes a plurality of second expansion chambers arranged in series.

In another preferred form, two of the first expansion chambers have differing expansion volumes.

In another preferred form, the expansion volumes increase along the first flow axis from the first end to the second end.

In another preferred form, the first flow axis and the second flow axis are parallel to one another.

In another preferred form, the cross-sectional shape of the first flow channel and the second cross-sectional shape of the second flow channel are the same.

In another preferred form, the cross-sectional shape of the first flow channel and the cross-sectional shape of the second flow channel each have a polygonal shape.

In another preferred form, the polygonal shape is one of a hexagon, a diamond, or a rhombus.

In another preferred form, the valve closure member is a ball member that rotates along a closing axis between the first closed position and the second fully-open position.

BRIEF DESCRIPTION OF THE DRAWINGS

FIG. 6A is a side cross-sectional view of a flow channel assembly of the aerodynamic noise reducing element of FIG. 5.

FIG. 6B is a side cross-sectional view of the aerodynamic noise reducing element of FIG. 5 with the flow channel assembly of FIG. 6A.

FIG. 6C is a side cross-sectional view of the aerodynamic noise reducing element of FIG. 5 including a plurality of flow channel assemblies of FIG. 6A.

DETAILED DESCRIPTION

Figure 1:
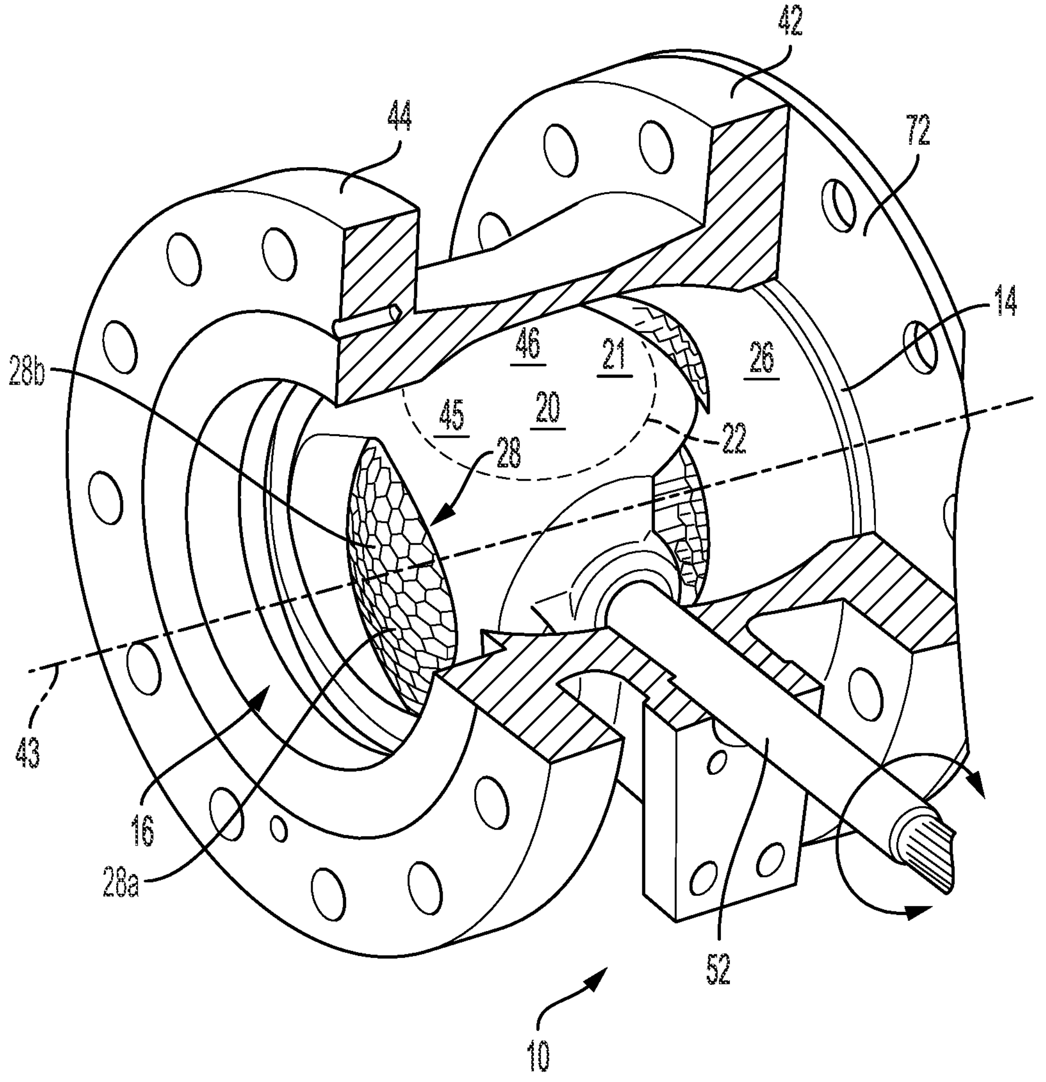
FIG. 1 is an isometric and partial sectional view of an exemplary embodiment of a rotary valve assembly with a valve closure member in a fully-open position.

Although the following text discloses a detailed description of example methods, apparatus and/or articles of manufacture, the legal scope of the property right is defined by the claims. Accordingly, the following detailed description is to be construed as exemplary only and does not describe every possible example, as describing every possible example would be impractical, if not impossible. Numerous alternative examples could be implemented, using either current technology or technology developed after the filing date of this patent. Such alternative examples would still fall within the scope of the claims.

The valves described herein advantageously provide aerodynamic noise reduction within control valves while having very little flow restriction. Thus, the disclosed valves are highly efficient in reducing aerodynamic noise. The disclosed valve elements may be significantly smaller and/or lighter than current elements with aerodynamic noise reduction devices. Thus, the disclosed valves may have smaller valve bodies that current valves.

While the aerodynamic noise reducing elements are described herein with respect to ball valves, the aerodynamic noise reducing elements may also be used in other types of valves, such as rotary valves, globe valves, sliding stem cages, diffusers, either upstream or downstream of the control element.

Additionally, the aerodynamic noise reducing elements in the disclosed valves may be customized for particular uses by adjusting the sizes and shapes of the internal chambers and/or the number of chamber stages. Moreover, the disclosed valves may be combined with more traditional noise suppression devices, such as noise reducing trims, to achieve a more comprehensive noise reduction.

The disclosed aerodynamic noise reducing elements are particularly advantageous for reducing the aerodynamic noise of compressible fluids in control valves. By splitting the fluid flow into multiple flow paths and forcing the compressible fluid to flow through flow channels having multiple staged internal pressure drop features, the corresponding fluid expansion due to the pressure drop is accommodated by increasing flow area in the flow channels between an inlet and an outlet. By staging the pressure drop through the flow channels, the overall energy of the compressible fluid is reduced in stages, thereby reducing aerodynamic noise generated within the valve system due to turbulence and/or shock waves.

While the aerodynamic noise reducing elements described herein are particularly useful in reducing unwanted aerodynamic noise in compressible fluids, in other embodiments, the aerodynamic noise reducing elements disclosed herein may be useful in controlling cavitation in liquid control valves.

Unless specified otherwise, any of the features or characteristics of any one of the embodiments of the valves disclosed herein may be combined with the features or characteristics of any of the other embodiments of valves.

As illustrated in FIGS. 1-4, a valve assembly 10 includes a valve body 12 defining an inlet 16 and an outlet 14. A valve seat 18 is defined by or coupled to the valve body 12 between the inlet 16 and the outlet 14. A valve closure member 20 is coupled to the valve body 12, and the valve closure member 20 is displaceable relative to the valve body 12 between a closed (first) position (illustrated in FIGS. 3 and 4) and a fully-open (second) position (illustrated in FIGS. 1 and 2). In the closed (first) position illustrated in FIG. 3, a sealing portion 22 (indicated as a dashed line) of the valve closure 20 member sealingly engages a sealing portion 24 of the valve seat 18 to prevent flow of a fluid from the inlet 16 to the outlet 14. In the fully-open (second) position illustrated in FIGS. 1 and 2, the sealing portion 22 of the valve closure member 20 is offset from the sealing portion 24 of the valve seat 18 to permit flow of the fluid from the inlet 16 to the outlet 14.

Figure 2:
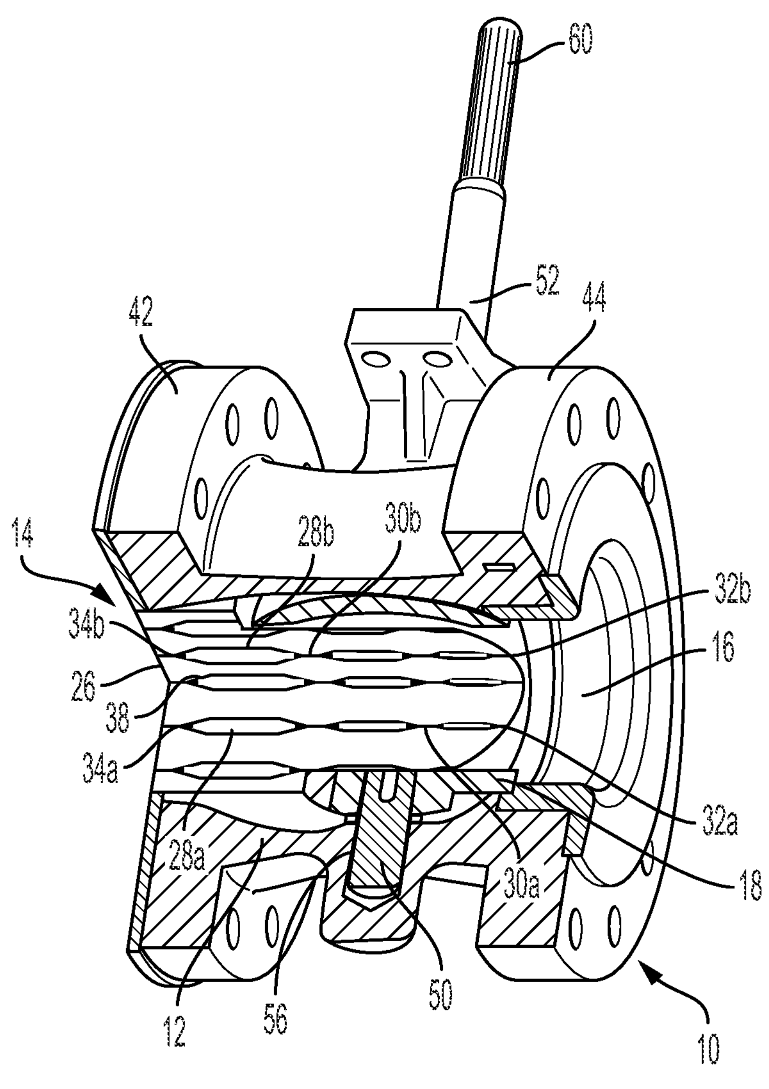
FIG. 2 is an isometric and partial sectional view of the embodiment of FIG. 1.

As illustrated in FIG. 2, the valve assembly 10 also includes an aerodynamic noise reducing element 26, and the aerodynamic noise reducing element 26 includes a plurality of flow channels 28. The plurality of flow channels 28 includes a first flow channel 28*a* extending along a first flow axis 30*a* from an open first end 32*a* to an open second end 34*a*. The plurality of flow channels 28 also includes a second flow channel 28*b* extending along a second flow axis 30*b* from an open first end 32*b* to an open second end 34*b*.

By forming the first flow channel 28*a* and the second flow channel 28*b* (and in some embodiments, each of the plurality of flow channels 28 and/or all of the aerodynamic noise reducing element 26) as a single, unitary structure (which may, for example, be formed, created, or fabricated using any of the additive manufacturing processes or techniques that will be described in following paragraphs), the geometry of the cross-sectional shapes of the first flow channel 28*a* and the second flow channel 28*b* may be precisely manufactured to optimize flow therethrough. Such optimized flow geometry is difficult or impossible to achieve using conventional machining/casting processes. The optimized flow geometry results in walls between adjacent flow areas that are thinner—and stronger—than conventional tubes, thereby reducing material cost. Moreover, the optimized flow geometry results in efficient pressure drops with minimal noise.

The disclosed aerodynamic noise reducing elements 26 advantageously reduce turbulence and/or shock wave generated noise by staging multiple smaller pressure reductions through the first flow channel 28*a* and the second flow channel 28*b*, and by splitting the compressible fluid flow into multiple flow paths, for example, one flow path through the first flow channel 28*a* and another flow path through the second flow channel 28*b*. By both staging multiple smaller pressure reductions and by splitting the fluid flow path into multiple flow paths, the disclosed aerodynamic noise reducing element 26 spreads energy loss during the pressure reduction process over a larger area in the flow path, which creates smaller turbulence eddies and lowers or eliminates sonic flow to reduce or eliminate shock wave generated noise.

Due to the thinner walls and/or optimized geometry, the number of flow passages can be increased in the same area, and therefore the flow capacity of the fluid flowing through the aerodynamic noise reducing element 26 is increased while simultaneously reducing spreading the pressure reduction of the compressible fluid over many fluid flow paths, which contributes to reduced aerodynamic noise.

The optimized geometry also allows the overall shape of the aerodynamic noise reducing element 26 to be precisely controlled. The optimized geometry also may act to stage the pressure drop through the each individual flow channel (e.g., each of the flow channels 28) by, for example, successive expansion of the chambers 38 and/or diffusion and communication to other flow chambers 38 with a larger volume. In addition, the aerodynamic noise reducing element 26 is (or portions of the aerodynamic noise reducing element 26 are) may be formed as an assembly, thereby reducing the production cost to secure each of the plurality of flow channels 28. The material may also result in a substantial reduction in weight of the aerodynamic noise reducing element 26 as opposed to conventional devices. The material may be corrosion resistant and may therefore not require a further manufacturing step.

Turning to the valve assembly 10 in more detail, FIG. 1 illustrates an embodiment of the valve body 12 that defines the inlet 16 and the outlet 14, and the inlet 16 and the outlet 14 may each extend along a body longitudinal axis 43. An inlet flange 44 may be disposed at a first end portion of the valve body 12 at or adjacent to the inlet 16 of the valve body 12, and the inlet flange 44 may be adapted to connect the inlet 16 to a portion of upstream pipe (not shown) in any known manner. An outlet flange 42 may be disposed be disposed at a second end portion of the valve body 12 at or adjacent to the outlet 14 of the valve body 12, and the outlet flange 42 may be adapted to connect the outlet 14 to a portion of downstream pipe (not shown) in any known manner. The inlet flange 44 and the outlet flange 42, as well as the portion of the valve body 12 defining the inlet 16 and the outlet 14 may be symmetrically formed about the body longitudinal axis 43. In the disclosed embodiment, fluid may flow through the valve body 12 from the inlet 16 to the outlet 14 or from the outlet 14 to the inlet 16.

Figure 3:
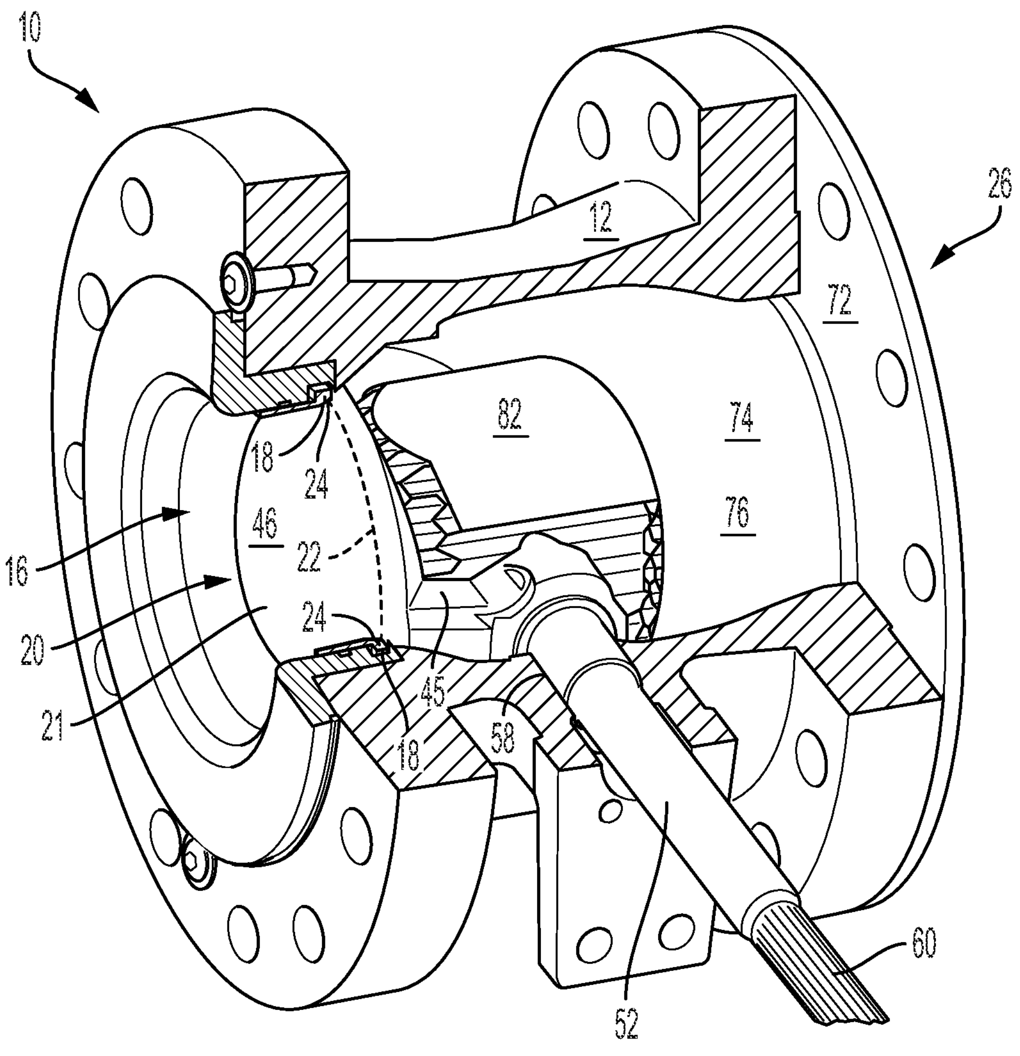
FIG. 3 is an isometric and partial sectional view of the embodiment of FIG. 1 with the valve closure member in a closed position.

The valve seat 18 (which is illustrated in FIGS. 2 and 3 but omitted for clarity in FIG. 1) may be disposed between the inlet 16 and the outlet 14 and may have an annular shape that may be symmetrically formed about the body longitudinal axis 43. All or a portion of the valve seat 18 may be integrally formed with the valve body 12, or all or a portion of the valve seat 18 may be coupled to the valve body 12. As illustrated in FIG. 3, the valve seat 18 may include the sealing portion 24 which may have an annular shape and may be adapted to sealingly engage the sealing portion 22 of the valve closure member 20 when the valve closure member 20 is in the closed first position of FIG. 3. All or a portion of the sealing portion 24 may be a made from a resilient material or from a rigid material.

The valve closure member 20 is coupled to the valve body 12, and the valve closure member 20 is displaceable relative to the valve body 12 between the closed first position (illustrated in FIG. 3) and the fully-open second position (illustrated in FIGS. 1 and 2). The valve closure member 20 may also displace to a third partially-open position between the first closed position and the second fully-open position.

Figure 4:
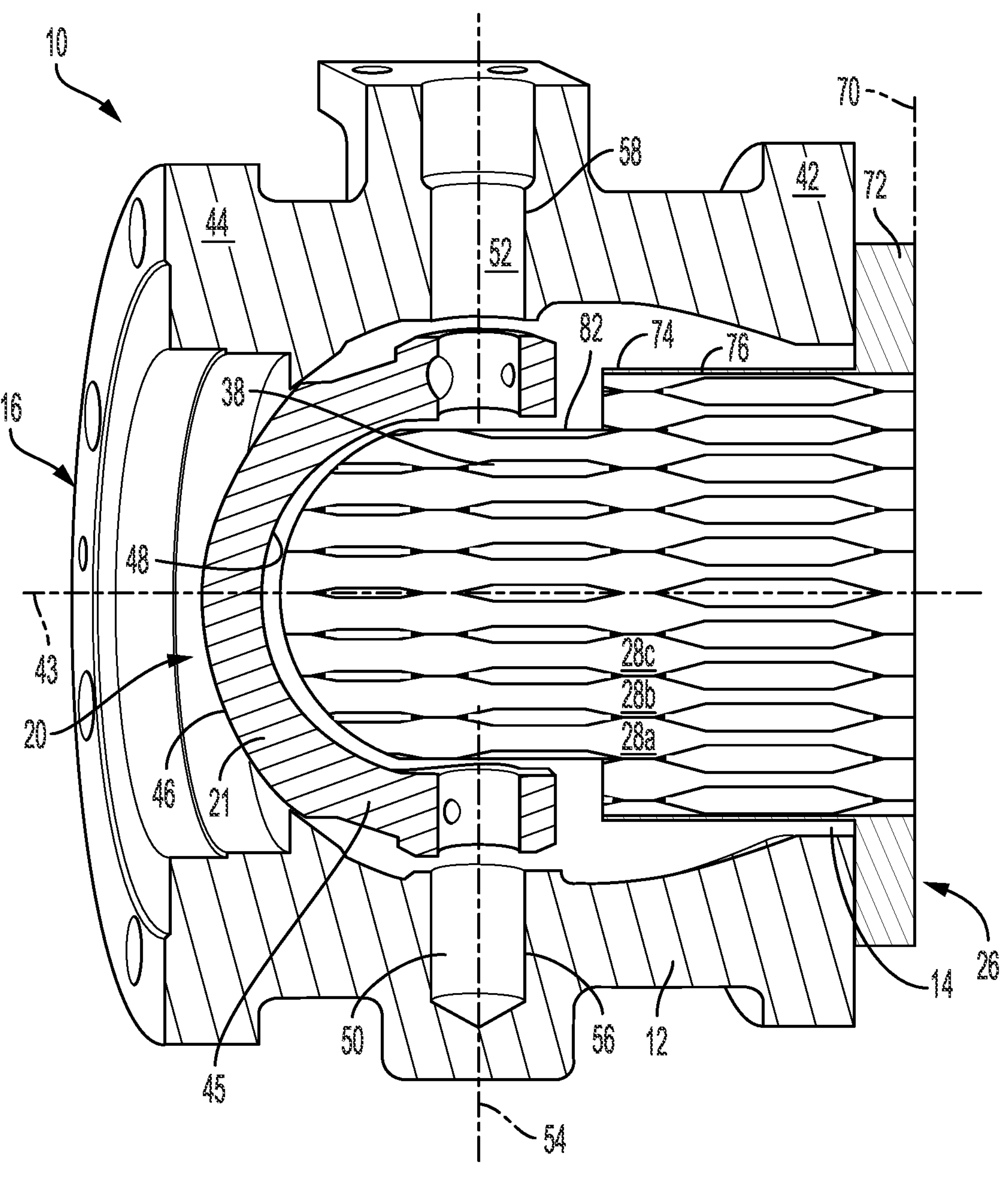
FIG. 4 is a partial sectional top view of the embodiment of FIG. 3.

The valve closure member 20 may have any shape and/or configuration to prevent fluid from flowing from the inlet 16 to the outlet 14 (or from the outlet 14 to the inlet 16) when in the closed first position and to allow fluid to flow from or between the inlet 16 to the outlet 14 (or between the outlet 14 to the inlet 16) when in the fully-open second position. For example, as illustrated in FIG. 4, the valve closure member 20 may be a ball member 21 having a ball member body 45 having a convex sealing surface 46. The sealing surface 46 may have any suitable shape such that the sealing portion 22 of the valve closure member 20 sealingly engages the sealing portion 24 of the valve seat 18 (to prevent flow of the fluid from the inlet 16 to the outlet 14, or vice versa) when the valve closure member 20 is in the closed first position. For example, the sealing surface 46 may have (or substantially have) a shape of a partial sphere. In other embodiments, as discussed further below, the sealing surface 46 may have a shape of a complete sphere with a throughbore. The ball member body 45 may also have a concave inner surface 48 that may be opposite to the convex sealing surface 46, and the inner surface 48 may correspond in shape to the sealing surface 46 such that all or portions of the ball member body 45 may optionally have a uniform or substantially uniform cross-sectional thickness. For example, the inner surface 48 may have (or substantially have) a shape of a partial sphere having a smaller radius than the sealing surface 46.

The ball member 21 may also have a first stem portion 50 and a second stem portion 52 extending along a pivot axis 54, and the first stem portion 50 and the second stem portion 52 may each be coupled to a portion of the ball member body 45. The first stem portion 50 may extend into a blind bore 56 formed in the valve body 12 and an intermediate portion of the second stem portion 52 may extend through a stem aperture 58 formed through the valve body 12 such that an end portion 60 of the second stem portion 52 is disposed exterior to the valve body 12. The end portion 60 of the second stem portion 52 may be adapted to be coupled to a valve actuator (not shown), and the valve actuator may be any suitable actuator capable or rotating the valve closure member 20 between the first closed position and the second fully-open position. The pivot axis 54 may extend normal to the body longitudinal axis 43 and may intersect the body longitudinal axis 43.

When the valve closure member 20 (e.g., the ball member 21) is in the closed first position as illustrated in FIG. 3, the convex sealing surface 46 of the ball member 21 may be positioned relative to the valve seat 18 such that the sealing portion 22 of the ball member 21 sealingly engages the sealing portion 24 of the valve seat 18. To displace the ball member 21 to the fully-open second position illustrated in FIG. 1, the actuator (not shown) rotates the second stem portion 52 about the pivot axis 54 a suitable rotational distance (e.g., 90 degrees) such that the entire sealing surface 46 of the ball member 21 may be disposed away from the valve seat 18 and such that no portion of the ball member 21 obstructs or substantially obstructs fluid flow from the inlet 16 to the outlet 14 (or vice versa). Said another way, in the fully-open second position, the sealing portion 22 of the ball member 21 does not sealingly engage the sealing portion 24 of the valve seat 18, thereby allowing fluid to flow from the inlet 16 to the outlet 14 (or vice versa). In some embodiments, when fluid flows from the outlet 14 to the inlet 16, fluid pressure against the inner surface 48 of the ball member 21 when the ball member 21 is in the first closed position (and when fluid flows from the inlet 16 to the outlet 14) provides additional force when the sealing portion 22 of the ball member 21 is in sealing engagement with the sealing portion 24 of the valve seat 18.

To displace the ball member 21 to the partially-open third position, the actuator (not shown) rotates the second stem portion 52 about the pivot axis 54 a suitable rotational distance (e.g., 30 degrees to 60 degrees) such that a portion of the entire sealing surface 46 of the ball member 21 may be disposed away from the valve seat 18 but that a portion of the ball member 21 obstructs or substantially obstructs fluid flow from the inlet 16 to the outlet 14 (or vice versa). One having ordinary skill in the art would recognize that fluid flow can be regulated from the inlet 16 to the outlet (or vice versa) by rotating the ball member 21 a desired rotational distance about the pivot member between the closed first position and the fully-open second position.

In some embodiments, the ball member 21 (e.g., the ball member body 45) may also translate along the body longitudinal axis 43 (e.g., by a cam action that is not shown) such that the sealing portion 22 of the ball member 21 sealingly engages the sealing portion 24 of the valve seat 18 when the ball member 21 is in the closed first position.

As illustrated in FIG. 2, the valve assembly 10 also includes the aerodynamic noise reducing element 26 that includes the plurality of flow channels 28. The aerodynamic noise reducing element 26 may include any suitable number of flow channels 28 to reduce pressure of a compressible fluid flowing from the inlet 16 to the outlet 14 (or vice versa) of the valve body 12. The flow channels 28 are not necessarily illustrated to scale in the Figures. More specifically, the flow channels 28 in the Figures are illustrated as being relatively large to ease discussion of the flow channels 28. The flow channels 28 in some embodiments will be considerably smaller and more plentiful. As illustrated in FIG. 2, the plurality of flow channels 28 includes the first flow channel **28*a* and the second flow channel 28*b*. Any number of additional flow channels 28** may be included, such as a third flow channel, a fourth flow channel, a fifth flow channel, etc.

Figure 8:
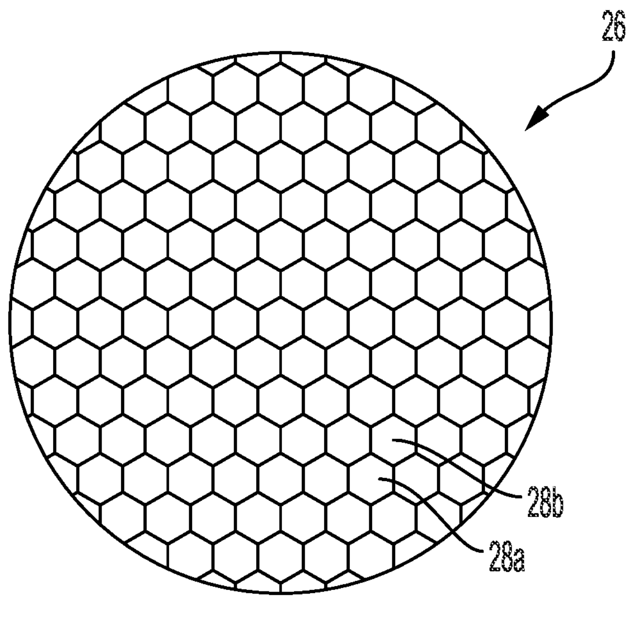
FIG. 8 is a front view of an alternate embodiment of an aerodynamic noise reducing element having hexagon-shaped flow channel cross-sections.

The first flow channel **28*a* may extend along the first flow axis 30*a* from the open first end 32*a* to the open second end 34*a*, and the first flow axis 30*a* may be linear and parallel to the body longitudinal axis 43. The inner surface that defines the first flow channel 28*a* (or defining an aperture that defines the first flow channel 28*a*) may have any suitable first cross-sectional shape or combination of shapes normal to the first flow axis 30*a*. In some embodiments, the first cross-sectional shape of the first flow channel 28*a* may be uniform from the first end 32*a* to the second end 34*a*. In other embodiments, the first cross-sectional shape may vary from the first end 32*a* to the second end 34*a* of the first flow channel 28*a*. For example, as illustrated in FIGS. 1 and 8, the cross-sectional shape may be polygonal, such as the hexagonal opening shape illustrated. In other examples, the cross-sectional shape may be circular, such as the circular opening shape illustrated in FIG. 5**.

As illustrated in FIG. 2, the plurality of flow channels 28 includes the second flow channel **28*b* extending along the second flow axis 30*b* from the open first end 32*b* to an open second end 34*b*. In some embodiments, the second flow axis 30*b* may be linear and parallel to the first flow axis 30*a* and/or the body longitudinal axis 43. The inner surface that defines the second flow channel 28*b* (or defining an aperture that defines the second flow channel) may have any suitable second cross-sectional shape (or combination of shapes) normal to the second flow axis 30*b*. In some embodiments, the cross-sectional shape of the second flow channel 28*b* may be identical to the cross-sectional shape(s) of the first flow channel 28*a* described above, and the corresponding dimensions of the cross-sectional shape(s) of the second flow channel 28*b* may be identical to those of the first cross-sectional shape(s) of the first flow channel 28*a* such that an area of the second flow channel 28*b* may be equal to an area the first flow channel 28*a*. In other embodiments, the cross-sectional shape of the second flow channel 28*b* may be identical to the cross-sectional shape of the first flow channel 28*a*, but one or more of the corresponding dimensions of the cross-sectional shape of the second flow channel 28*b* may be greater than (or less than) those of the cross-sectional shape of the first flow channel 28*a* such that the area of the cross-sectional shape of the second flow channel 28*b* may be different than the area the cross-sectional shape of the first flow channel 28*a***.

Figure 5:
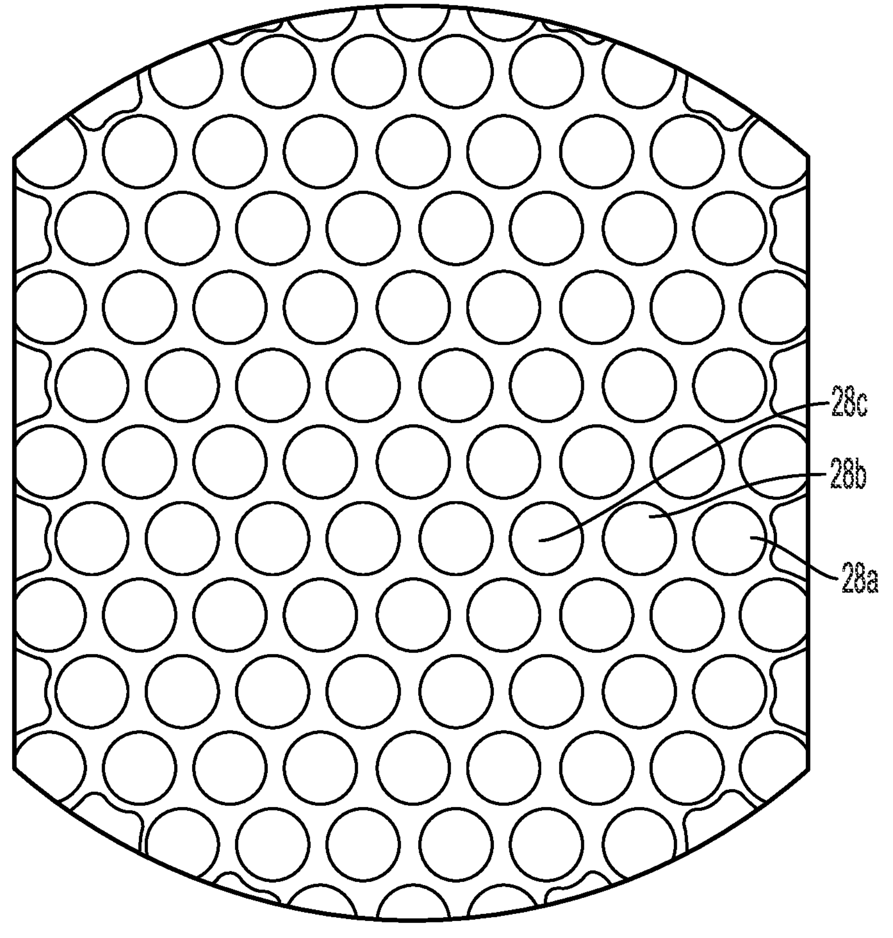
FIG. 5 is a front view of an embodiment of an aerodynamic noise reducing element.

In some embodiments (not shown), the cross-sectional shape(s) of the second flow channel **28*b* may not be identical to the cross-sectional shape(s) of the first flow channel 28*a*. In such embodiments, the cross-sectional shape of the second flow channel 28*b* may be uniform from the first end 32*b* to the second end 34*b* of the second flow channel 28*b*. In other embodiments, the cross-sectional shape of the second flow channel 28*b* may vary from the first end 32*a* to the second end 34*a* of the second flow channel 28*b*. As illustrated in FIG. 1, the cross-sectional shape of the second flow channel 28*b* may be a non-circular shape, such as a polygonal shape. In some embodiments, the polygonal shape may be a hexagon, a pentagon, an octagon, or a diamond/rhombus shape, for example. In other embodiments, the cross-sectional shape of the first flow channel 28***a* may be a circular shape (as illustrated in FIG. 5) or an oval shape.

As previously explained, any number of additional flow channels 28 may be included in the plurality of flow channels 28 (e.g., a third flow channel, a fourth flow channel, a fifth flow channel, etc.) Any and all of the additional flow channels 28 may extend along a corresponding (e.g., a third, fourth, fifth, etc.) flow axis 30 from an open first end 32 to an open second end 34, and the corresponding flow axis 30 may be parallel to the body longitudinal axis 43.

As illustrated in FIG. 4, the plurality of flow channels 28 of the aerodynamic noise reducing element 26 may be laterally bounded by an imperforate circumferential wall 74 that may have a first portion 76 (that may be cylindrical or partially-cylindrical) that is disposed adjacent to a flange 72. The first portion 76 may be symmetrically formed about the body longitudinal axis 43 or a portion of the first portion 76 may be symmetrically formed about the body longitudinal axis 43.

The circumferential wall 74 may also have a second portion 82 (that may be cylindrical or partially-cylindrical) that may extend from the first portion 76 away from the flange 72. The second portion 82 may be symmetrically formed about the body longitudinal axis 43 or a portion of the second portion 82 may be symmetrically formed about the body longitudinal axis 43. The second portion 82 (or the cylindrical portion of the second portion 82) may have a diameter that is less than a diameter of the cylindrical portion of the first portion 76. In some embodiments, each of an outer group of the plurality of flow channels 28 located in the first portion 76 may have a shorter length than any or all of an inner group of the plurality of flow channels 28 located in the second portion 82. The lengths and positions of the second ends 34 of the flow channels 28 in the outer group may depend upon interior geometry of the valve body 12 and/or the closure member 20. For example, the second ends 34 of some of the flow channels 28 in the outer group may be configured to minimize gaps between the second ends 34 and the first stem portion 50 and/or the second stem portion 52 to improve pressure reduction.

In some embodiments, the entire aerodynamic noise reducing element 26 may be integrally formed as a single, unitary structure. That is, the first flow channel 28*a*, the second flow channel 28*b*, and a third flow channel 28*c* (and any additional flow channels, such as a fourth flow channel, fifth flow channel, sixth flow channel, etc.) may be integrally formed as a single, unitary structure. The flange 72 and/or circumferential wall 74 may also be integrally formed with the first flow channel 28*a*, the second flow channel 28*b*, and the third flow channel 28*c* (and any number of other flow channels 28) to form a single, unitary structure.

In some embodiments, the first flow channel 28*a*, the second flow channel 28*b*, and the third flow channel 28*c* may be integrally formed using an additive manufacturing technique or additive manufacturing process. The additive manufacturing process may be any additive manufacturing process or technology that builds three-dimensional objects by adding successive layers of material on a material. The additive manufacturing process may be performed by any suitable machine or combination of machines. The additive manufacturing process may typically involve or use a computer, three-dimensional modeling software (e.g., Computer Aided Design, or CAD, software), machine equipment, and layering material. Once a CAD model is produced, the machine equipment may read in data from the CAD file and layer or adds successive layers of liquid, powder, sheet material (for example) in a layer-upon-layer fashion to fabricate a three-dimensional object.

The additive manufacturing process may include any of several processes, such as example only, a three-dimensional printing process, a stereolithography ("SLA") process, a fused deposition modeling ("FDM") process, multi-jet modeling ("MJM") process, and a selective laser sintering ("SLS") process. In some embodiments, the additive manufacturing process may include a laser powder bed fusion process. Any suitable material can be used to form the aerodynamic noise reducing element 26, such as a high-strength and low-weight material, such as a metal or metallic material.

In some embodiments, two or more portions of the aerodynamic noise reducing element 26 may be fabricated using additive manufacturing processes, and the two or more portions of the aerodynamic noise reducing element 26 may be coupled (e.g., by welding) to form the aerodynamic noise reducing element 26.

Figure 10:
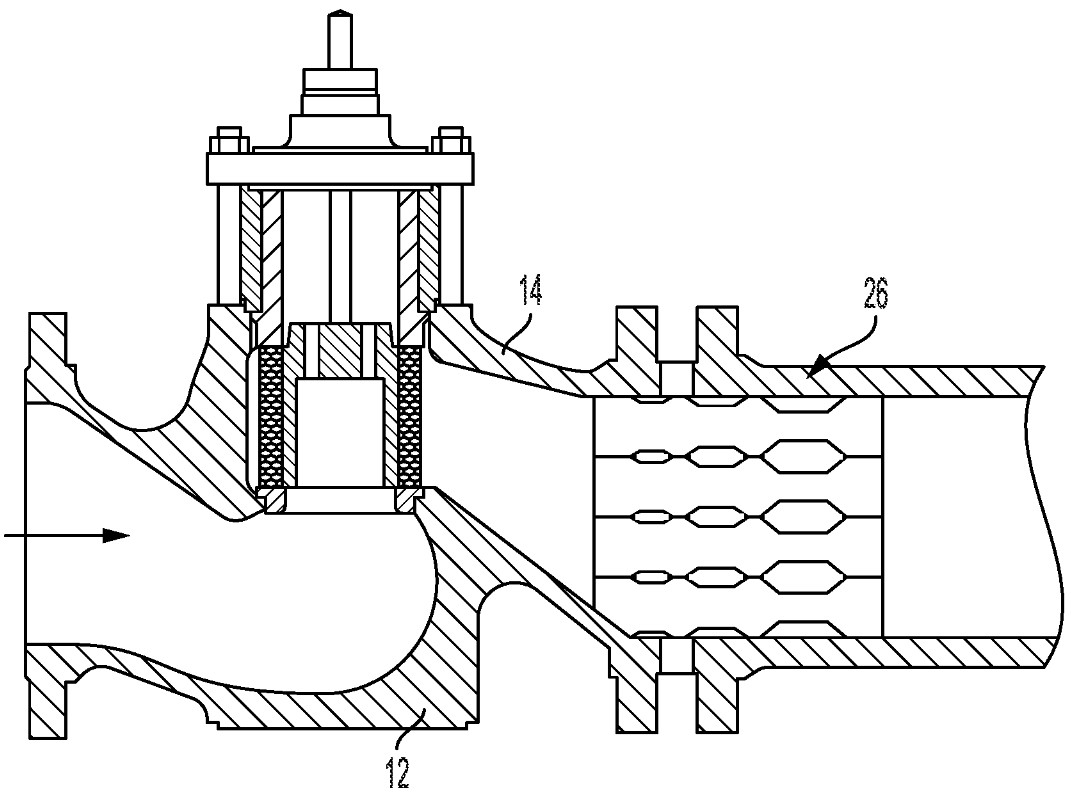
FIG. 10 is a side cross-sectional view of an alternate embodiment of a control valve assembly having an aerodynamic noise reducing element located downstream of a valve trim.

In some embodiments, all or a portion of the aerodynamic noise reducing element 26 may be disposed in the outlet 14 of the valve body 12, or downstream of the valve body 12, such as by connecting the flange 72 to the outlet flange 42 of the valve body 12 and/or a flange of a portion of downstream pipe (see FIG. 10) to secure the aerodynamic noise reducing element 26 to the valve body 12 and/or to the downstream pipe. In other embodiments, when the aerodynamic noise reducing element 26 has no flange 76, all or a portion of the aerodynamic noise reducing element 26 may be disposed in the outlet 14 of the valve body 12 and the aerodynamic noise reducing element 26 may be coupled or supported in the outlet 14 and/or a portion of downstream pipe (FIG. 10) to maintain a desired position of the aerodynamic noise reducing element 26 relative to the valve body 12 and/or the downstream pipe.

One having ordinary skill would recognize that all or a portion of the aerodynamic noise reducing element 26 may be instead inserted in the inlet 16 and/or in a portion of upstream pipe (not shown) using any of the methods described above. In addition, two or more aerodynamic noise reducing elements 26 (not shown) may be used, such as a first aerodynamic noise reducing element 26 disposed on one side of the valve seat 18 and a second aerodynamic noise reducing element 26 disposed on the other side of the valve seat 18. The first and second aerodynamic noise reducing element 26 may be identical or may be different. For example, the cross-sectional shapes of the flow channels 28 of the first aerodynamic noise reducing element 26 may differ from the cross-sectional shapes of the flow channels 28 of the second aerodynamic noise reducing element 26 to increase total length of tubing for further pressure staging. In some embodiments, the first aerodynamic noise reducing element 26 could be disposed in upstream piping and/or the inlet 16 and the second aerodynamic noise reducing element 26 could be disposed in downstream piping and/or the outlet 14, and the first aerodynamic noise reducing element 26 may have larger flow areas than the second aerodynamic noise reducing element 26 to further stage pressure drop in the fluid.

Turning now to FIG. 6A, an aerodynamic noise reducing assembly 27 is illustrated. The aerodynamic noise reducing assembly 27 may be constructed in accordance with any of the additive manufacturing techniques described above. The aerodynamic noise reducing assembly 27 includes the first flow channel 28*a* and the second flow channel 28*b*. As discussed above, the first flow channel 28*a* and the second flow channel 28*b* may have the same shapes and/or dimensions, or the first flow channel 28*a* and the second flow channel 28*b* may have different shapes and/or dimensions. Regardless, each of the first flow channel 28*a* and the second flow channel includes an expansion chamber (e.g., a first expansion chamber 38*a* and a second expansion chamber 38*b*). The first expansion chamber 38*a* is located between the first end (e.g., inlet) 32*a* of the first flow channel 28*a* and the second end (e.g., outlet) 34*a* of the first flow channel 28*a* along the first flow axis 30*a*. The second expansion chamber 38*b* is similarly located in the second flow channel 28*b*.

In the subsequent description, the first flow channel 28*a* and the first expansion chamber 38*a* are discussed in more detail. The description of the first flow channel 28*a* (and any elements of the first flow channel 28*a*) apply equally to the second flow channel 28*b* (and any other flow channels) unless specifically stated otherwise.

The first expansion chamber 38*a* includes a first nozzle 41*a* and a first expansion inlet 43*a*. The first expansion inlet 43*a* leads into an increased volume portion 47*a* of the first expansion chamber 38*a*. As the fluid enters the increased volume portion 47*a*, fluid velocity decreases, fluid pressure drops, and the fluid expands. As the fluid flows along the first flow axis 30*a*, multiple expansion chambers 38 can be arranged along the first flow axis 30*a* to further decrease the pressure of the fluid. The successive pressure reduction stages reduce cavitation and noise of fluid flowing through the valve by reducing the size and intensity of turbulent eddy currents in the fluid by spreading the pressure reductions over a larger distance. In the illustrated embodiment, the expansion chambers 38 are either constant in size (e.g., FIGS. 6A-6C) or increase in size along a fluid flow path (e.g., FIGS. 2, 4, 7, 9, and 10). Regardless, a portion of fluid energy is extracted in each expansion chamber 38, which takes energy out of the fluid flow leaving less energy to create turbulent flow eddies that create aerodynamic noise.

Once the aerodynamic noise reducing assembly 27 is manufactured, the aerodynamic noise reducing assembly 27 may be attached to a valve closure member 20, such as the ball valve member 23 illustrated in FIG. 6B. The aerodynamic noise reducing assembly 27 may be attached to an internal bore 51 of the ball valve member 23 by any attachment technique, such as welding, brazing, gluing, interference fits, fasteners, claims, etc. Alternatively, the ball valve member 23 may be manufactured as a single integral piece with the aerodynamic noise reducing assembly 27, for example, by any of the additive manufacturing techniques described above.

Turning now to FIG. 6C, in an alternate embodiment, a plurality of aerodynamic noise reducing assemblies 27*a*, 27*b*, 27*c*, may be separately manufactured and assembled in the ball valve member 23. In the embodiment of FIG. 6C, the aerodynamic noise reducing assemblies 27*a*, 27*b*, 27*c*, when assembled in the ball valve member 28, form flow channels 28 having multiple expansion chambers 38. For example, a first flow channel 28*a* may include a first expansion chamber 38*a*1, a second expansion chamber 38*a*2, and a third expansion chamber 38*a*3.

Figure 7:
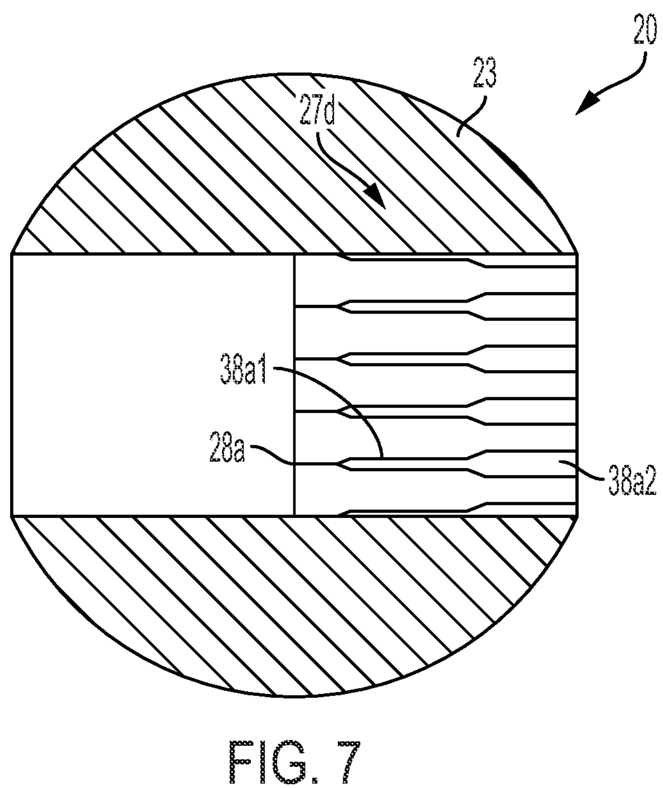
FIG. 7 is a side-cross-sectional view of the aerodynamic noise reducing element of FIG. 5 including an alternate embodiment of a flow channel assembly.

Turning now to FIG. 7, an alternate embodiment of a ball valve member 23 is illustrated with an alternate embodiment of an aerodynamic noise reducing assembly 28*d*. The aerodynamic noise reducing assembly 27*d* includes a first flow channel 28*a* having a first expansion chamber 38*a*1 and a second expansion chamber 38*a*2. The expansion chambers 38*a*1 and 38*a*2 of the embodiment of FIG. 7 differ from previous embodiments in that the first expansion chamber 38*a*1 and the second expansion chamber 38*a*2 are continuous. In other words, the first expansion chamber 38*a*1 and the second expansion chamber 38*a*2 form a single expansion chamber with staged increasing volume.

Figure 9:
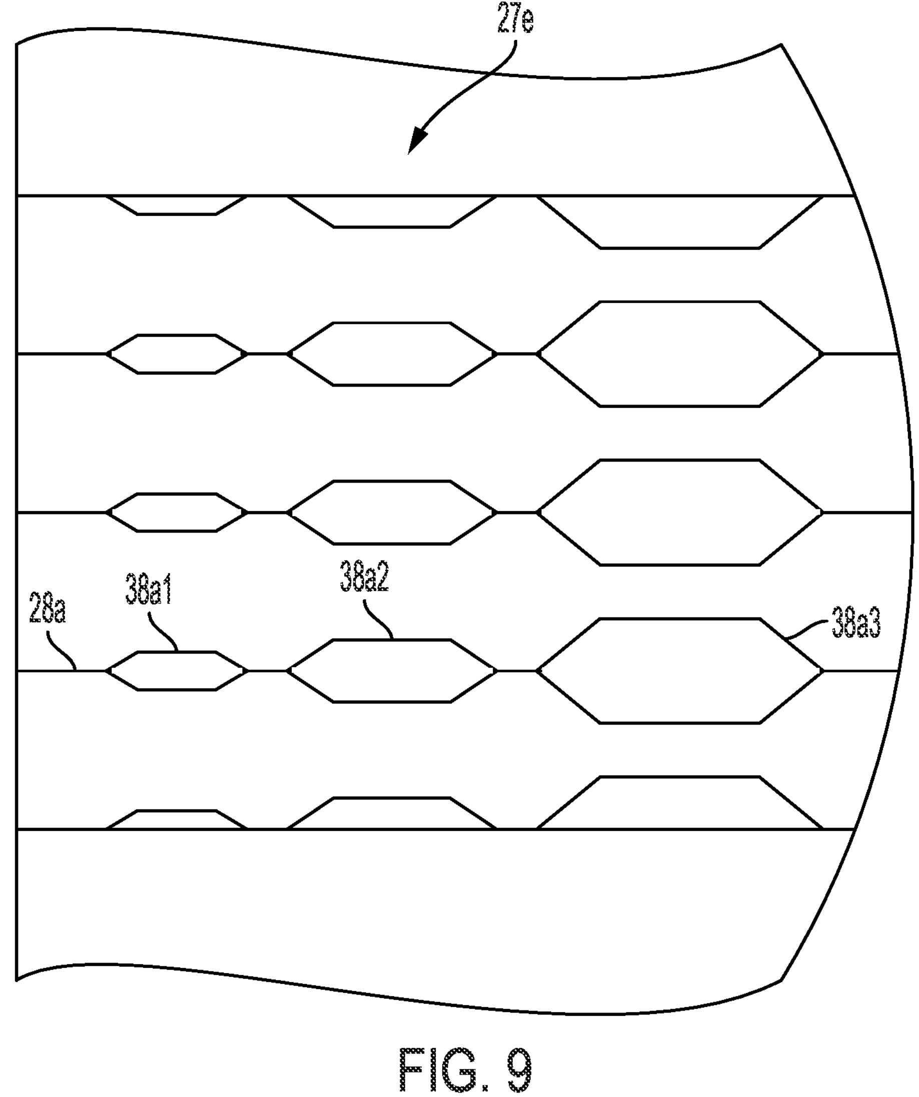
FIG. 9 is a side cross-sectional view of an alternate embodiment of a flow channel assembly.

Tuning now to FIG. 9, another embodiment of an aerodynamic noise reducing assembly 27*e* is illustrated. The aerodynamic noise reducing assembly 27*e* includes a first flow channel 28*a* having a first expansion chamber 38*a*1, a second expansion chamber 38*a*2, and a third expansion chamber 38*a*3. The first expansion chamber 38*a*1 has a smaller volume than the second expansion chamber 38*a*2, which, in turn, has a smaller volume than the third expansion chamber 38*a*3. Thus, the first flow channel 28*a* has discrete, staged, increasing volume expansion chambers 38.

The disclosed aerodynamic noise reducing assemblies advantageously include expansion chambers arranged along an axis that is parallel to a flow axis of fluid when the valve is in a fully open condition.

More expansion chambers may advantageously reduce wear of the trim material by producing greater reductions in fluid pressure and by reducing cavitation. Generally, more expansion chambers are advantageous as the differential pressure across the trim increases. Conversely, if the differential pressure across the trim is smaller, fewer throttling stages reduce manufacturing complexity and thereby increase economic viability.

The disclosed aerodynamic noise reducing elements are advantageously used to reduce aerodynamic noise in compressible fluids. However, the disclosed aerodynamic noise reducing elements may be used with other fluids, for example non-compressible fluids, to reduce cavitation and the noise resulting therefrom.

Additionally, the disclosed aerodynamic noise reducing elements advantageously achieve smaller diameters, longer lengths, and tighter spacing of the flow channels when compared to known aerodynamic noise reducing elements. The smaller diameters, longer lengths, and tighter spacing of the flow channels allows the disclosed aerodynamic noise reducing elements to achieve greater pressure staging and greater noise reduction than known aerodynamic noise reducing elements, while also packing many flow channels closely together to produce higher flow capacity.

The foregoing list of aspects reflects a variety of the embodiments explicitly contemplated by the present disclosure. Those of ordinary skill in the art will readily appreciate that these aspects are neither limiting of the embodiments disclosed herein, nor exhaustive of all of the embodiments conceivable from the disclosure above, but are instead meant to be exemplary in nature.

The invention claimed is:

1. A valve assembly comprising;

a valve body defining an inlet, an outlet, and a body longitudinal axis;

a valve seat coupled to the valve body;

a valve closure member coupled to the valve body, the valve closure member displaceable relative to the valve body between a first closed position and a second fully-open position, wherein in the first closed position, a sealing portion of the valve closure member sealingly engages a sealing portion of the valve seat to prevent flow of a compressible fluid from the inlet of the valve body to the outlet of the valve body, and in the second fully-open position, the sealing portion of the valve closure member is offset from the sealing portion of the valve seat to permit flow of the compressible fluid from the inlet of the valve body to the outlet of the valve body, wherein the valve closure member includes a stem portion extending along a pivot axis perpendicular to the body longitudinal axis;

an aerodynamic noise reducing element, wherein the aerodynamic noise reducing element includes a plurality of flow channels, the plurality of flow channels including;

a first flow channel extending along a first flow axis from an open first end to an open second end, the first flow channel having a first fluid expansion chamber; and a second flow channel extending along a second flow axis from an open first end to an open second end, the second flow channel having a second fluid expansion chamber, wherein the first flow axis and the second flow axis are parallel to the body longitudinal axis, wherein the first flow channel has an inner surface that defines a first flow area, the inner surface of the first flow channel having a first cross-sectional shape, wherein the second flow channel has an inner surface that defines a second flow area, the inner surface of the second flow channel having a second cross-sectional shape, wherein the first cross-sectional shape is different than the second cross-sectional shape, wherein the first flow channel includes a plurality of first fluid expansion chambers arranged in series, wherein the fluid expansion chambers in the plurality of first fluid expansion chambers are continuous, forming a single fluid expansion chamber with a progressively increasing staged volume, and wherein the first flow channel is exclusively linear and defines a flow path to guide flow of the compressible fluid.

2. The valve assembly of claim 1, wherein the expansion chambers in the plurality of first fluid expansion chambers are discrete.

3. The valve assembly of claim 1, wherein the second flow channel includes a plurality of second fluid expansion chambers arranged in series.

4. The valve assembly of claim 1, wherein two of the first fluid expansion chambers have differing fluid expansion volumes.

5. The valve assembly of claim 4, wherein the fluid expansion volumes increase along the first flow axis from the first end to the second end.

6. The valve assembly of claim 1, wherein the cross-sectional shape of the first flow channel and the second cross-sectional shape of the second flow channel are the same.

7. The valve assembly of claim 1, wherein the cross-sectional shape of the first flow channel and the cross-sectional shape of the second flow channel each have a polygonal shape.

8. The valve assembly of claim 7, wherein the polygonal shape is one of a hexagon, a diamond, or a rhombus.

9. The valve assembly of claim 1, wherein the valve closure member is a ball member that rotates along a closing axis between the first closed position and the second fully-open position.

10. An aerodynamic noise reducing element adapted for use with a valve assembly having a valve body defining an inlet and an outlet, a valve seat coupled to the valve body between the inlet and the outlet, and a valve closure member coupled to the valve body and displaceable relative to the valve body between a first closed position and a second fully-open position, wherein in the first closed position, a sealing portion of the valve closure member sealingly engages a sealing portion of the valve seat, and in the second fully-open position, the sealing portion of the valve closure member is offset from the sealing portion of the valve seat, the aerodynamic noise reducing element comprising:

a plurality of flow channels, the plurality of flow channels including:

a first flow channel extending along a first flow axis from an open first end to an open second end, the first flow channel having an inner surface that defines a first flow area, the inner surface of the first flow channel having a first cross-sectional shape and a third cross-sectional shape normal to the first flow axis, and the first flow channel including a first expansion chamber; and a second flow channel extend along a second flow axis from an open first end to an open second end, the second flow channel having an inner surface that defines a second flow area, the inner surface of the second flow channel having a second cross-sectional shape normal to the second flow axis, and the second flow channel having a second expansion chamber, wherein the first cross-sectional shape is different than the second cross-sectional shape, wherein the first flow channel includes a plurality of first fluid expansion chambers arranged in series, wherein the fluid expansion chambers in the plurality of first fluid expansion chambers are continuous, forming a single fluid expansion chamber with a progressively increasing staged volume, and wherein the expansion between two of the fluid expansion chambers in the plurality of first fluid expansion chambers is gradual.

11. The aerodynamic noise reducing element of claim 10, wherein the cross-sectional shape of the first flow channel and the cross-sectional shape of the second flow channel are a polygonal shape.

12. The aerodynamic noise reducing element of claim 11, wherein the polygonal shape is one of a hexagon, a diamond, or a rhombus.

13. The aerodynamic noise reducing element of claim 10, wherein the cross-sectional shape of the first flow channel and the cross-sectional shape of the second flow channel are a non-circular shape.

14. The valve assembly of claim 10, wherein the first flow channel is exclusively linear and defines a flow path to guide flow of the compressible fluid.

15. The valve assembly of claim 10, wherein the first flow channel consists of a single passage configured for flow of the compressible fluid.

16. A valve assembly comprising;

a valve body defining an inlet and an outlet;

a valve seat coupled to the valve body;

a valve closure member coupled to the valve body, the valve closure member displaceable relative to the valve body between a first closed position and a second fully-open position, wherein in the first closed position, a sealing portion of the valve closure member sealingly engages a sealing portion of the valve seat to prevent flow of a compressible fluid from the inlet of the valve body to the outlet of the valve body, and in the second fully-open position, the sealing portion of the valve closure member is offset from the sealing portion of the valve seat to permit flow of the compressible fluid from the inlet of the valve body to the outlet of the valve body; and an aerodynamic noise reducing element, wherein the aerodynamic noise reducing element includes a flange, a circumferential wall, and a plurality of flow channels laterally bounded by the circumferential wall, the flange being disposed outside of the valve body and the plurality of flow channels including:

a first flow channel extending along a first flow axis from an open first end to an open second end, the first flow channel having a first fluid expansion chamber; and a second flow channel extending along a second flow axis from an open first end to an open second end, the second flow channel having a second fluid expansion chamber, wherein the first flow channel includes a plurality of first fluid expansion chambers arranged in series, wherein the fluid expansion chambers in the plurality of first fluid expansion chambers are continuous, forming a single fluid expansion chamber with a progressively increasing staged volume, and wherein the first flow channel defines an exclusively linear flow path and consists of a single passage configured to guide the flow of the compressible fluid.

17. The valve assembly of claim 16, wherein the first flow axis and the second flow axis are parallel to one another.

18. The valve assembly of claim 16, wherein each of the first fluid expansion chamber and the second fluid expansion chamber is constant in size.

19. The valve assembly of claim 16, wherein the expansion between two of the fluid expansion chambers in the plurality of first fluid expansion chambers is gradual.

20. The valve assembly of claim 16, wherein the fluid expansion volumes in the plurality of first fluid expansion chambers increase along the first flow axis from the open first end to the open second end.

* * * * *